(12) United States Patent
Bainter

(10) Patent No.: US 9,215,847 B2
(45) Date of Patent: Dec. 22, 2015

(54) APPARATUS FOR ANCHORING AN IRRIGATION TOWER

(71) Applicant: Wesley Allen Bainter, Hoxie, KS (US)

(72) Inventor: Wesley Allen Bainter, Hoxie, KS (US)

( * ) Notice: Subject to any disclaimer, the term of this patent is extended or adjusted under 35 U.S.C. 154(b) by 0 days.

(21) Appl. No.: 14/293,778

(22) Filed: Jun. 2, 2014

(65) Prior Publication Data

US 2014/0360107 A1    Dec. 11, 2014

Related U.S. Application Data

(60) Provisional application No. 61/833,625, filed on Jun. 11, 2013.

(51) Int. Cl.
*A01G 25/09* (2006.01)

(52) U.S. Cl.
CPC .............. *A01G 25/092* (2013.01); *A01G 25/09* (2013.01)

(58) Field of Classification Search
CPC ... A01G 25/092; A01G 25/09; A01G 25/095; A01G 25/097; E04H 12/2215; E04H 12/2223; E04H 12/223; E02D 5/74; E02D 5/801; E02D 5/80
USPC .............................. 52/155–166, 705; 239/723
See application file for complete search history.

(56) References Cited

U.S. PATENT DOCUMENTS

| | | | |
|---|---|---|---|
| 2,801,132 A * | 7/1957 | Shuck ........................... | 239/736 |
| 3,771,719 A * | 11/1973 | Raso et al. .................... | 239/728 |
| 3,878,860 A | 4/1975 | Pritchard | |
| 3,896,890 A | 7/1975 | Gale | |
| 3,973,409 A * | 8/1976 | Asayama ................... | 405/259.5 |
| 4,163,459 A * | 8/1979 | Hegemann .................... | 239/728 |
| 4,184,639 A * | 1/1980 | Miller ........................... | 239/733 |
| 4,445,643 A | 5/1984 | Thorsby et al. | |
| 4,590,732 A * | 5/1986 | Hallman ......................... | 52/704 |
| 5,152,495 A * | 10/1992 | Jacinto et al. ................. | 248/545 |
| 5,579,794 A | 12/1996 | Sporta | |
| 5,649,788 A * | 7/1997 | Jewett ........................... | 405/244 |
| 5,660,504 A | 8/1997 | Reinert, Sr. | |
| 5,944,452 A | 8/1999 | Reinert, Sr. | |
| 6,216,803 B1 * | 4/2001 | Deken .......................... | 175/162 |
| 6,273,645 B1 | 8/2001 | Hamre | |
| 6,547,203 B1 | 4/2003 | Willard | |
| 6,722,085 B2 | 4/2004 | Pittman | |
| 7,303,157 B1 | 12/2007 | Fixemer | |
| 7,438,243 B1 * | 10/2008 | Erickson ....................... | 239/735 |
| 7,581,707 B2 | 9/2009 | Saraf | |
| 7,921,794 B1 | 4/2011 | Cullom et al. | |
| 7,950,200 B2 | 5/2011 | Tropiano | |
| 8,474,779 B1 | 7/2013 | Ronnkvist | |

(Continued)

OTHER PUBLICATIONS

PCT Search Report for PCT/US2014/041723, Mailing Date Oct. 20, 2014.

*Primary Examiner* — Elizabeth A Plummer
*Assistant Examiner* — Kyle Walraed-Sullivan

(57) ABSTRACT

A remotely operable anchoring system for a mobile irrigation apparatus includes anchoring units mounted to irrigation towers. The anchoring units are remotely operable through a control module and have anchor members which, upon command, can be moved by the anchoring units from a retracted position to an extended position in which each anchor member penetrates and anchors itself into the soil beneath the irrigation tower. Upon command, after the danger of high wind has passed, each anchor member may be retracted from the extended position to the retracted position in preparation for future use.

5 Claims, 5 Drawing Sheets

(56) References Cited

U.S. PATENT DOCUMENTS

| | | |
|---|---|---|
| 8,782,970 B2 | 7/2014 | Griffiths |
| 8,839,572 B2 | 9/2014 | Lee |
| 8,998,162 B1 * | 4/2015 | Gutha et al. ............ 248/545 |
| 2004/0071511 A1 * | 4/2004 | May ....................... 405/231 |
| 2004/0221543 A1 * | 11/2004 | Eleas et al. ............. 52/736.1 |
| 2005/0103252 A1 * | 5/2005 | Brunning et al. ........ 114/295 |
| 2006/0060749 A1 | 3/2006 | Dahlstrom |
| 2006/0211282 A1 | 9/2006 | Onogi et al. |
| 2007/0113491 A1 * | 5/2007 | Royals ..................... 52/161 |
| 2008/0092936 A1 | 4/2008 | Carabillo |
| 2008/0302080 A1 | 12/2008 | Hart |
| 2010/0300017 A1 * | 12/2010 | Bulloch ................... 52/157 |
| 2011/0036026 A1 * | 2/2011 | Lee ......................... 52/157 |
| 2012/0308308 A1 | 12/2012 | Stewart |
| 2014/0352597 A1 | 12/2014 | Bailey et al. |

* cited by examiner

APPARATUS FOR ANCHORING AN IRRIGATION TOWER

CROSS REFERENCE TO RELATED APPLICATIONS

This application claims the benefit of U.S. Provisional Patent Application 61/833,625 filed on Jun. 11, 2013, which is incorporated herein by reference.

FIELD

This invention relates to an apparatus that can be activated to anchor an irrigation tower of a mobile irrigation apparatus to prevent the irrigation tower from overturning in high wind conditions.

BACKGROUND

Pivot irrigation systems are used by dryland farmers to irrigate circular areas of square portions of farmland which usually extend approximately 2,640 feet on each side. Accordingly, a mobile irrigation system may include a stationary pump, an irrigation pipe elevated by mobile towers which feeds spaced irrigation heads which broadcast water. A common configuration is a center pivot system in which an elevated irrigation pipe and spaced irrigation heads are arranged radially from a center pivot including a stationary pump for supplying water to the center pivot system. Center pivot irrigation systems usually broadcast water in circular, semi-circular and even quarter-circular patterns. Mobile irrigation towers are usually supported by powered wheels for gradual movement. In a center pivot system, the wheel rotation rate is in proportion to the distance between the tower and the center pivot. In a center pivot system, the irrigation heads broadcast water at rates that are also proportional to their distances from the center pivot. Although the applicant will refer to "pivot irrigation systems" in this specification, the skilled reader should understand that this also includes so called "windshield wiper" irrigation systems used for irrigating rectangular areas of farm ground or smaller areas and even mobile tower systems which do not pivot about a center. Non-pivoting systems included an elongated raised pipe supported by evenly spaced mobile irrigation towers which all move at a constant in order to irrigate rectangular strips of land. The mobile towers of such strip irrigation systems are also susceptible to being overturned by high winds.

A significant risk encountered by farmers using mobile irrigation systems is the tendency of the elevated irrigation pipe and the mobile towers supporting the pipe to overturn in high wind conditions which occasionally occur in areas of the Midwest. The tendency to overturn is most pronounced in a center pivot system toward the distal end of the elevated irrigation pipe. Further, it is generally advantageous to build pivot irrigation systems from lightweight structures and materials in order to minimize power consumption, material use and soil compaction. This further increases the likelihood of the irrigation structure overturning during a storm. Still further, when the system is idle, it is typically drained of water, thereby reducing the weight of the irrigation structure and its ability to withstand high winds. What is needed is an apparatus that will anchor irrigation towers during high wind conditions, and more particularly, anchor the towers toward the distal end of the irrigation pipe.

SUMMARY

The above noted need is addressed by an anchor apparatus for selectively securing an irrigation tower to the surface of a field. The anchor apparatus includes at least one anchor unit which is fixed to at least one irrigation tower. The anchor unit includes a motor, an anchor member and an anchor member engaging portion. In this example, the anchor member which is an upright helically twisted flat bar which is threaded through the anchor member engaging portion. The motor is mounted on the anchor unit for sliding movement between a first retracted position and a second extended position. The motor is connected to the upper end of the anchor member in order to rotate the anchor member when the motor is activated. The anchor member is adapted for screwing into farm ground soil. When the motor is activated, the anchor member rotates and advances through the anchor member engaging portion as the anchor member penetrates and screws down into the soil beneath the irrigation tower thereby anchoring the anchor unit and the irrigation tower to the ground. As the anchor member advances, the motor translates relative to the anchor unit from the first retracted position to the second extended position.

Preferably, the irrigation apparatus includes a plurality of anchor units and a control module which is preferably remotely controllable to activate the motors of the anchor units. Preferably, the control module is remotely operable to operate in at least two modes: a first anchoring mode wherein the motor of each anchoring unit rotates the anchor member in a first direction to move the anchor member from a retracted position to an extended position in which the anchor member is screwed into the farm ground soil beneath the irrigation tower, and a second retracting mode wherein the motor of each anchoring unit rotates the anchor member in a second opposite direction to move the anchor member from the extended position to the retracted position.

DETAILED DESCRIPTION

Figure 1:
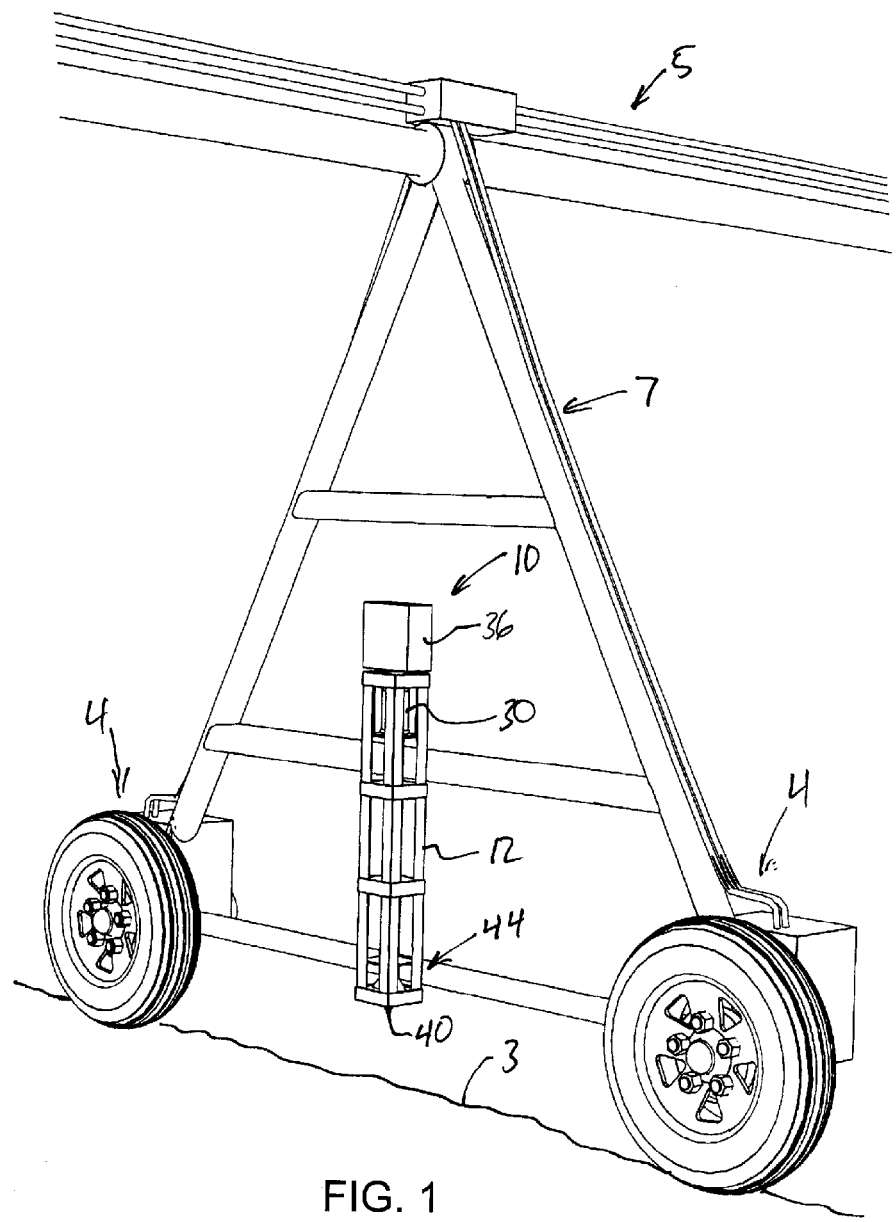
FIG. 1 is a first perspective view of an anchoring unit installed on a tower of a center pivot irrigation system.
Figures 2A, 2B:
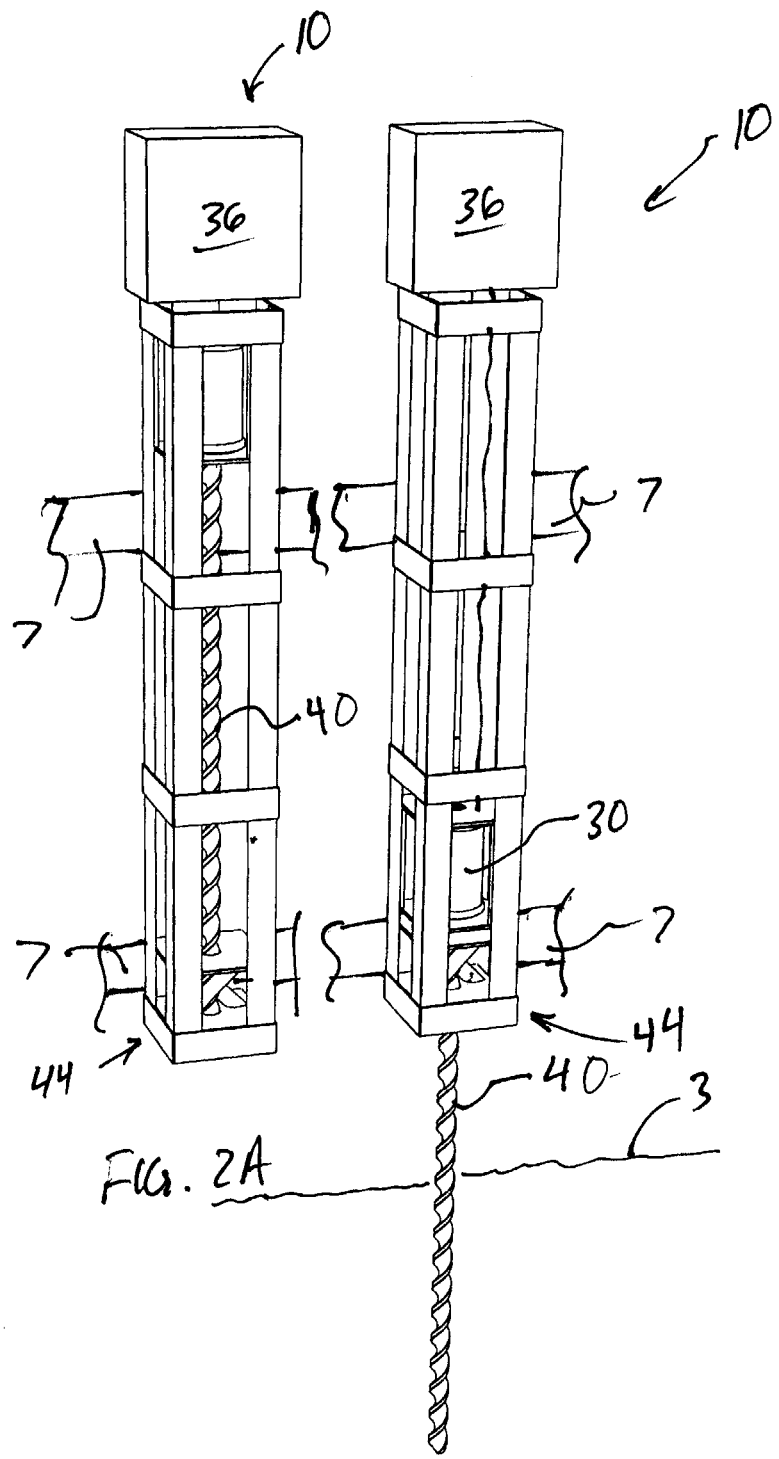
FIG. 2A is a first perspective view of an anchoring unit shown with the anchor member in a first retracted position.
FIG. 2B is a first perspective view of an anchoring unit shown with the anchor member in a second extended ground engaging position.

Referring to the figures, FIG. 1 provides a perspective view of an anchoring unit 10 mounted to an irrigation tower 7 of an irrigation apparatus 5 which is situated on the surface of farm ground soil 3. As can be seen in FIG. 1, irrigation tower 7 includes two electric motor driven wheels 4 suitable for moving tower 7 across farm ground soil 3. In this example, anchoring unit 10 includes an anchor frame 12 which is fixed to irrigation tower 7 and a control module 30. As can be seen in FIGS. 2A and 2B, in this example, each anchor unit 10 includes a helically twisted anchor member 40.

Anchor unit 10 is preferably mounted to two or more irrigation towers such as irrigation tower 7 shown in FIG. 1. Most preferably, in the case of a center pivot system, anchor units 10 are more frequently mounted to the towers that are most distant from the center pivot because such towers are more susceptible to overturning in high winds than irrigation towers that are closer to the center pivot. When activated, anchor unit 10 advances anchor member 40 so that it penetrates and screws into soil surface 3 thereby anchoring tower 7 in preparation for high wind conditions. Anchor unit 10 is designed to cause the rotation of anchor member 40 as it screws into soil 3 beneath irrigation tower 7. By operating in a reverse direction, anchor unit 10 can also retract the anchor member 40 by backing it out of the soil for later use.

Figure 3:
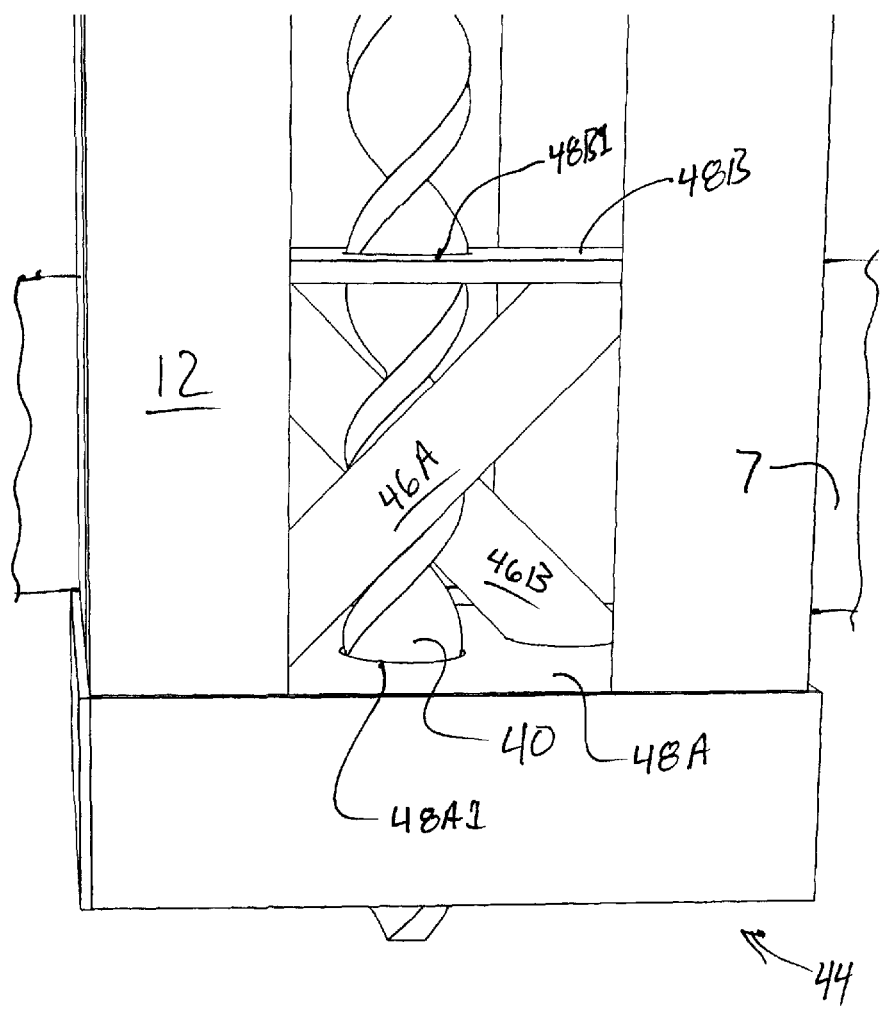
FIG. 3 is a magnified view of the anchor member engaging portion of the anchoring unit frame.

FIGS. 2 and 3 provide magnified views of anchor unit 10. As can be seen in FIG. 2, in this example, anchor unit 10 includes a frame 12, a motor 30, a battery and control module 36, an anchor member 40 and an anchor member engaging portion 44. In this example, battery and control module 36 contains a battery 36A and a control transmitter/receiver 36B for controlling motor 30. In this example, battery 36A and control module 36 is fixed to the upper end of frame 12. Motor 30 is translatably mounted to frame 12 for generally vertical motion between a first retracted position shown in FIG. 2A and a second extended position shown in FIG. 2B. In this example, motor 30 is also mounted so that it cannot rotate relative to frame 12.

Anchor member 40 is generally upright as is frame 12 and fixed to the drive shaft of motor 30 so that it can be rotated by motor 30. Anchor member 40, in this example, is fashioned from a steel bar which has a width greater than its thickness. In this example, the applicant has found that a steel bar having a width of approximately 1.5 inches and a thickness of 0.5 inches. The steel bar is preferably twisted about its longitudinal center line into a helical auger like shape thereby defining auger threads which have a pitch defined by the longitudinal distance covered by one full twist. In this example, the selected pitch is 5 inches. Of course, the width, thickness and pitch of the helical bar could vary significantly and still provide an effective anchor member. Still further, it would be possible to contrive other anchor members which would be effective if rotated and advanced into farm ground soil. It is also preferable that the distal end of anchor member 40 is pointed and that it has sharpened edges. An anchor member 40 which is fashioned in this manner can be screwed into farm ground soil when it is rotated about its center line and advanced or at least allowed to advance by a distance which is approximately equal to the pitch of the anchor member when the anchor member rotates a complete revolution. In this example, anchor member 40 has a length of 75 inches and the depth of penetration into the farm ground soil at full anchoring extension is preferably about 48 inches.

In order to drive anchor member 40 as described above, the applicant has found it is advantageous to employ an electric motor 30 that develops between 500 and 900 in-lbs of torque at between 20 and 30 rpm. In this example, the applicant used an electric 12 volt DC 28.6 amp motor rated at 739 ft-lbs at 24 rpm. This translates to approximately 0.45 hp or about 340 watts. Those skilled in the art will readily appreciate that such electric motor 30 could be substituted with a hydraulic motor or even an air motor having similar power output characteristics.

Figure 4:
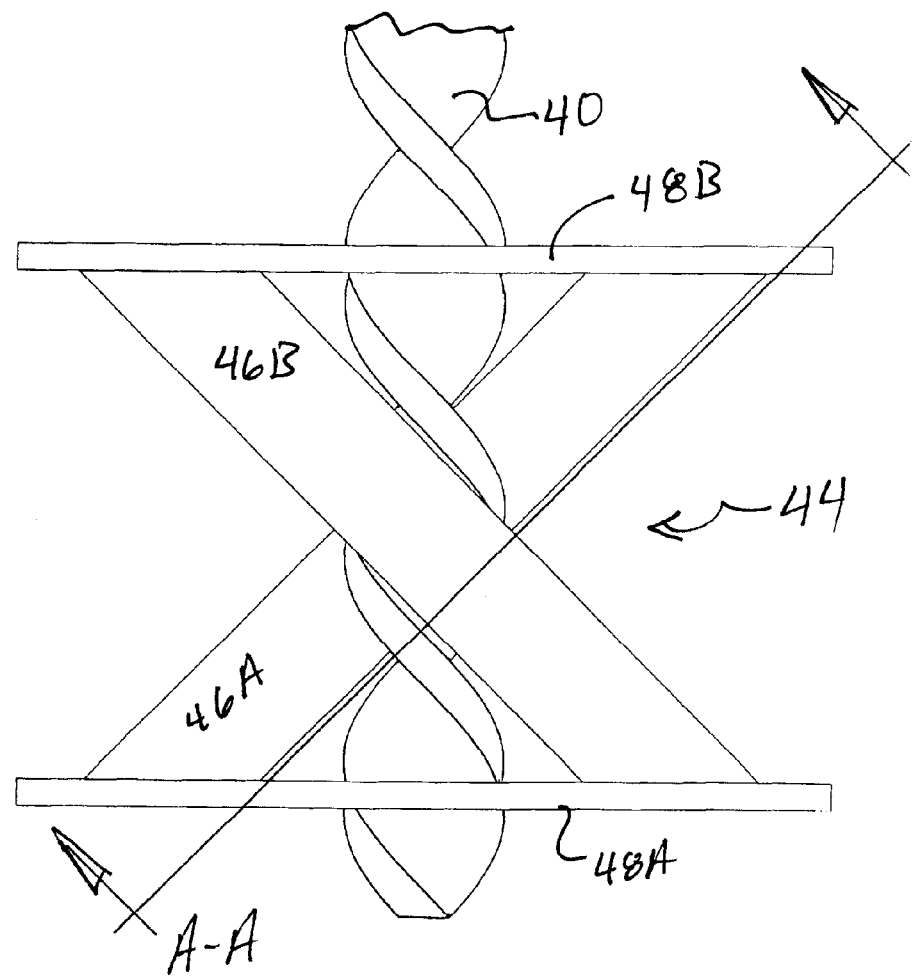
FIG. 4 is a magnified view of the anchor member engaging portion of the anchoring unit frame shown with portions of the anchoring unit frame removed for clarity.
Figure 5:
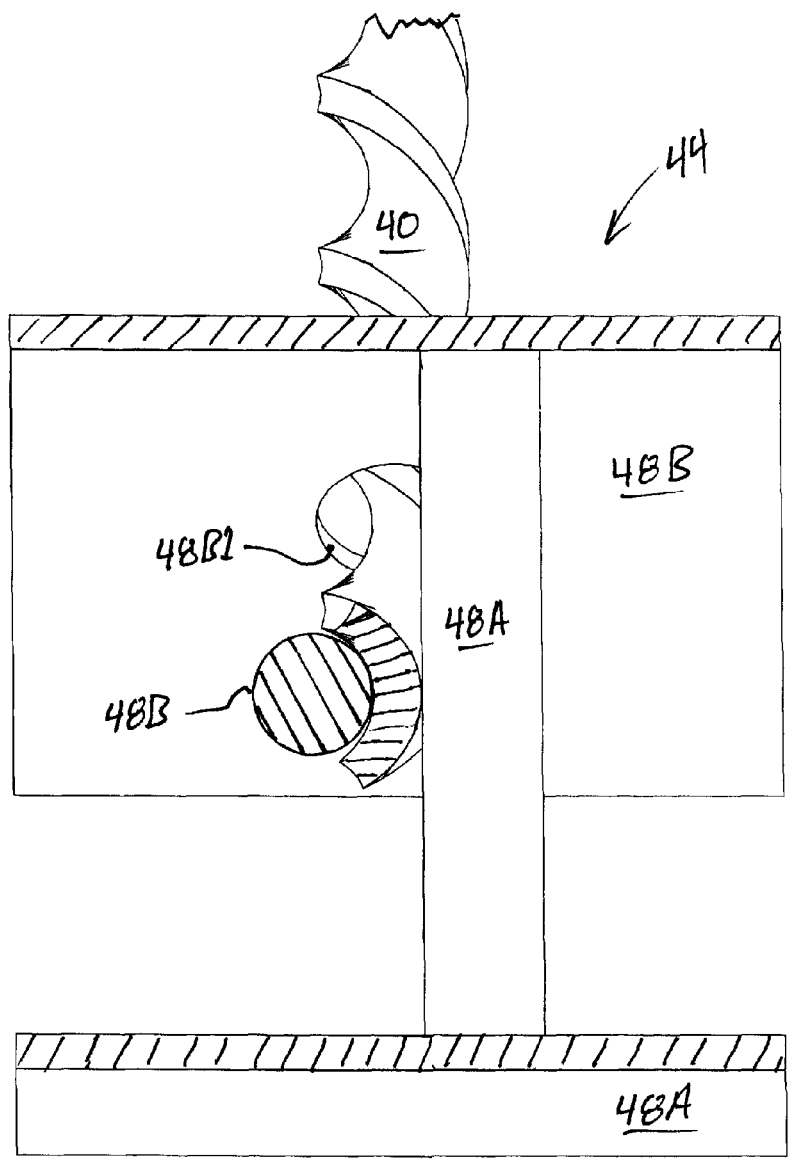
FIG. 5 is a cross-section view of the anchor member engaging portion of the anchoring unit frame taken from plane A-A indicated in FIG. 4.

Anchor member engaging portion 44 is best understood by referring to FIGS. 3-5. In this example, anchor member engaging portion 44 is preferably located at the lower end of frame 12. Anchor member engaging portion 44 includes a lower plate 48A and an upper plate 48B and two diagonally mounted cylindrical rods 46A and 46B which are disposed opposite each other. Rods 46A and 46B are fixed at their opposite ends to upper and lower plates 48A and 48B and further arranged to extend diagonally in opposite direction between plates 48A and 48B as shown in FIGS. 3, 4 and 5. Rods 46A and 46B are arranged to engage and fit into the spiral grooves presented by anchor member 40. Lower and upper plates 48A and 48B also present vertically aligned round holes 48A1 and 48B1 which receive anchor member 40. Thus, anchor member 40 is constrained to align with holes 48A1 and 48B1 it engages rods 46A and 46B. With this arrangement, as anchor member 40 turns with respect to anchor member engaging portion 44, anchor member 40 either advances through anchor member engaging portion 44 or retracts through anchor member engaging portion 44 depending on the direction of rotation. FIG. 5 is a cross section view taken from plane A-A indicated in FIG. 4. As can be seen in FIG. 5, rod 48B is received by the round groove presented by the auger like twisted surface of anchor member 40. The same is the case for the opposite rod 48A. Rods 48A and 48B have the advantage of contacting anchor member 40 along limited curved surfaces of anchor member 40 which the applicant believes minimizes the friction generated by the interaction of anchor member 40 and rods 48A and 48B.

Those skilled in the art will appreciate that anchor member engaging portion may also take the form of a female threaded portion which is fixed to frame 12 and which presents internal threads corresponding to the external threads presented by anchor member 40. Such a female threaded member could be a block of material having a negative volume removed which would correspond to the shape of anchor member 40. Such a block of material, possibly molded from Teflon or a similar low friction polymer could provide a threaded member for receiving anchor member 40. Thus, when motor 30 rotates and powers anchor member 40 while being free to translate toward the lower end of frame 12 as anchor member 40 advances through anchor member engaging portion 44, anchor member 40 contacts farm ground soil 3 and subsequently screws into farm ground soil 3 thereby anchoring irrigation tower 7 to prevent irrigation tower 7 from overturning in high wind conditions. Because anchor member engaging portion 44 causes anchor member 40 to advance by its pitch for every full rotation, anchor member engaging portion 44 provides the useful function of advancing anchor member 40 by an appropriate distance each time anchor member 40 rotates. However, those skilled in the art will appreciate that other means might be employed to advance motor 30 and anchor member 40 at a speed which is suitable for the rotation speed and pitch of anchor member 40.

Control module 36 shown in FIG. 1 is preferably capable of receiving and responding to wireless signals. Preferably, an operator should be able to remotely activate anchoring apparatus 10 which would initiate a sequence which would shut down irrigation system 5 if it is operating and then deploy anchor members 40 as described above. Preferably, a master control module would be present to execute the following steps upon receiving an appropriate signal: (1) Shut down the irrigation system so that no water is pumping and so that tower drive wheels are not turning. (2) Activate all of the anchor units to advance the anchor members from the retracted position to the extended position such that each anchor member penetrates the ground beneath its respective irrigation tower. Preferably also, the master control module would have the capability, upon receiving an appropriate "all clear" signal to do the following (1) withdraw all of the anchor members back to the retracted position, and (2) resume irrigation operations if needed.

Control module 36 also includes battery 36A as noted above. Since irrigation apparatus 5 typically includes an electrical system (not shown), it is possible to connect battery 36A to the electrical system of irrigation apparatus 5 and maintain battery 36A fully charged at all times.

As can be seen from the above description, the anchoring apparatus described above provides an effective means for selectively anchoring the towers of an irrigation system to prevent the extensive damage that can occur in high wind conditions. Numerous variations in the control system protocol can be envisioned. For example, high wind prediction data could be automatically accessed via on-line resources and evaluated to automatically generate commands to shut down irrigation systems and deploy anchors against predicted high wind conditions. However, such systems are configured, they generally need to be robust and capable of operating under their own power.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An anchor unit for anchoring a mobile irrigation tower to underlying farm ground soil the anchor unit comprising:
   (a) an irrigation tower including a generally upright frame fixed thereto having an upper end and a lower end,
   (b) a motor movably mounted to the frame for translation between a first retracted position and a second extended position,
   (c) an elongated upright anchor member to anchor the mobile irrigation tower in any desired location so as to render the irrigation tower immobile at that location, the anchor member being connected to the motor for rotation by the motor, the anchor member having an upper end connected to the motor and a lower end extending downwardly from the motor, the anchor member having at least a portion which is fashioned from a flat bar having a generally constant thickness which has been twisted into the shape of a helix thereby defining a helical anchor portion, the helical anchor portion presenting opposing helical surfaces, the helical anchor portion also having a pitch defined by a pitch distance which is a longitudinal length of the helical portion that spans a full helix rotation,
   (d) an anchor member engaging portion which is fixed to the frame, the anchor member engaging portion including a pair of opposite diagonally oriented rods which are oriented, spaced and sized to engage the opposing helical surfaces of the helical anchor portion, the rods being sufficiently spaced apart to receive the helical anchor portion there-between, the rods arranged such that when the helical anchor portion is turned by a full rotation in a direction of rotation, the helical anchor portion either advances or retracts depending on the direction of rotation by the pitch distance,
   (e) a remotely operable control unit suitable for activating the motor causing the motor and the anchor member to move from the first retracted position to the second extended position such that the anchor member screws into the soil at any desired location beneath the irrigation tower to thereby render the irrigation tower immobile at a desired location, and subsequently for causing the motor and the anchor member to turn in a second direction suitable for causing the motor and the anchor member to move from the second extended position to the first retracted position to thereby render the irrigation tower mobile and unanchored.

2. The apparatus of claim 1, wherein: the motor is an electric motor.

3. The apparatus of claim 1, wherein: the motor is a hydraulic motor.

4. The apparatus of claim 1, wherein: the motor is an air motor.

5. An anchor unit for in place anchoring of a tower structure of a mobile irrigation apparatus that can traverse over ground to be irrigated and wherein the mobile irrigation apparatus includes a plurality of tower structures, the anchor unit comprising:
   (a) each of the plurality of tower structures including a generally upright frame having upper and lower ends;
   (b) a motor movably mounted to the frame for translation between a first retracted position adjacent the upper end and a second extended position adjacent the lower end;
   (c) an anchor member having an upper end connected to the motor and a lower end operable for penetrating the ground when the motor translates to its second extended position and to be withdrawn from the ground when the motor translates to its retracted position, the lower end of the anchor member being fashioned from a flat bar having a generally constant thickness and has been twisted into the shape of a helix thereby defining a helical anchor portion having substantially the same thickness as the flat bar, the helical anchor portion presenting opposing helical surfaces, the helical anchor portion also having a pitch defined by a pitch distance which is a longitudinal length of the helical anchor portion that spans a full helix rotation,
   (d) an anchor member engaging portion including a pair of opposite diagonally oriented rods which are oriented, spaced and sized to engage the opposing helical surfaces of the helical anchor portion, the rods being sufficiently spaced apart to receive the helical anchor portion there-between, the rods arranged such that when the helical anchor portion is turned by a full rotation in a direction of rotation, the helical anchor portion either advances or retracts depending on the direction of rotation by the pitch distance, and,
   (e) a remotely operable control unit by which the motor can be controlled to drive each of the anchor members into the ground to anchor the tower structures and the mobile irrigation apparatus in any desired location rendering the mobile irrigation apparatus non-mobile at that location, and to withdraw the anchor members to permit the mobile irrigation apparatus to be once again become mobile.

* * * * *